No. 862,234. PATENTED AUG. 6, 1907.
M. BRAND.
APPARATUS FOR BAKING.
APPLICATION FILED MAR. 7, 1906.
2 SHEETS—SHEET 1.
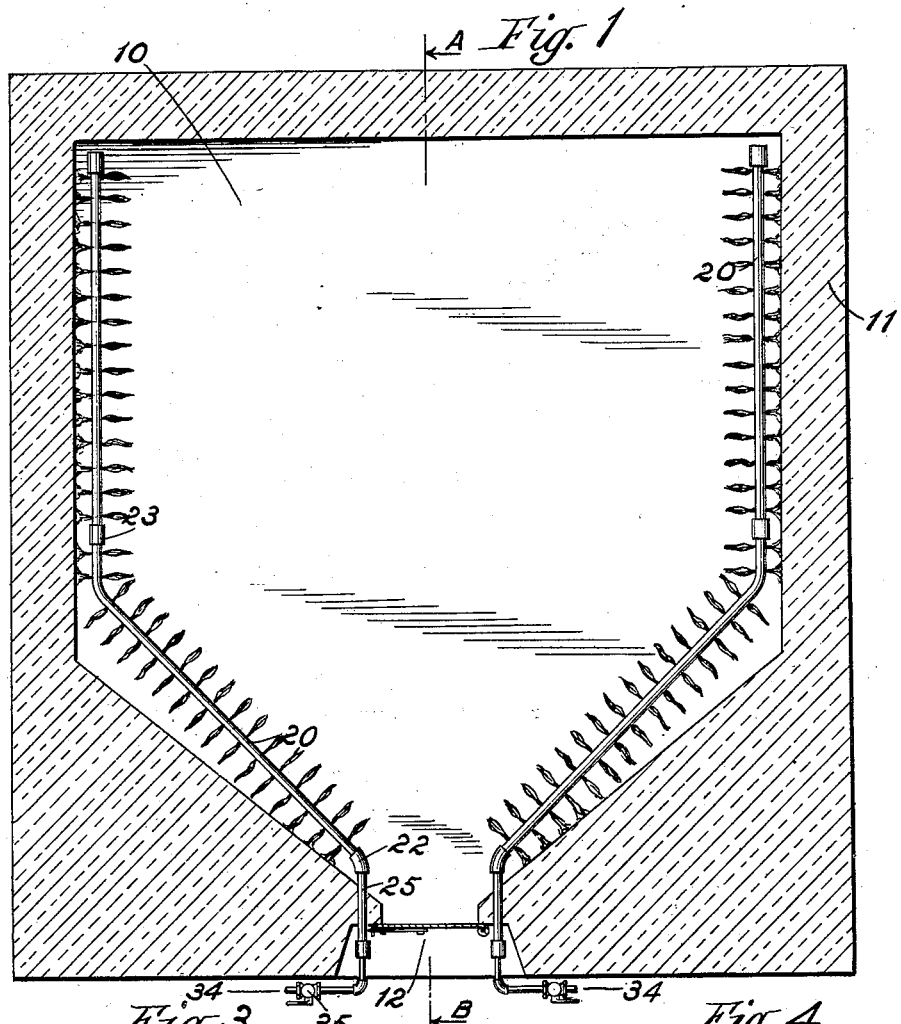
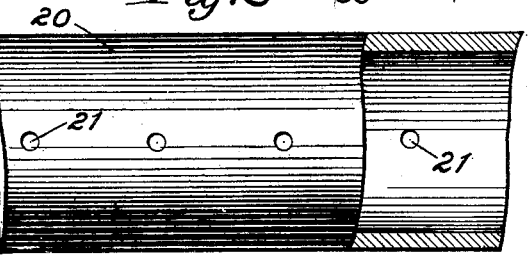
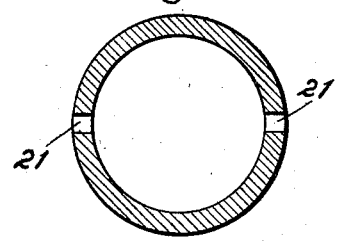
WITNESSES:
INVENTOR
Max Brand
BY
E. W. Marshall
ATTORNEY No. 862,234. PATENTED AUG. 6, 1907.
M. BRAND.
APPARATUS FOR BAKING.
APPLICATION FILED MAR. 7, 1906.
2 SHEETS—SHEET 2.
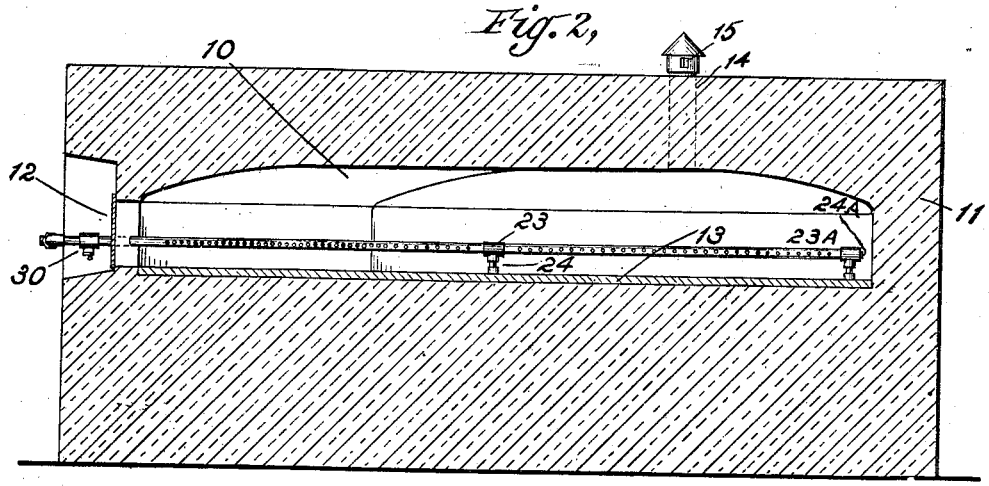
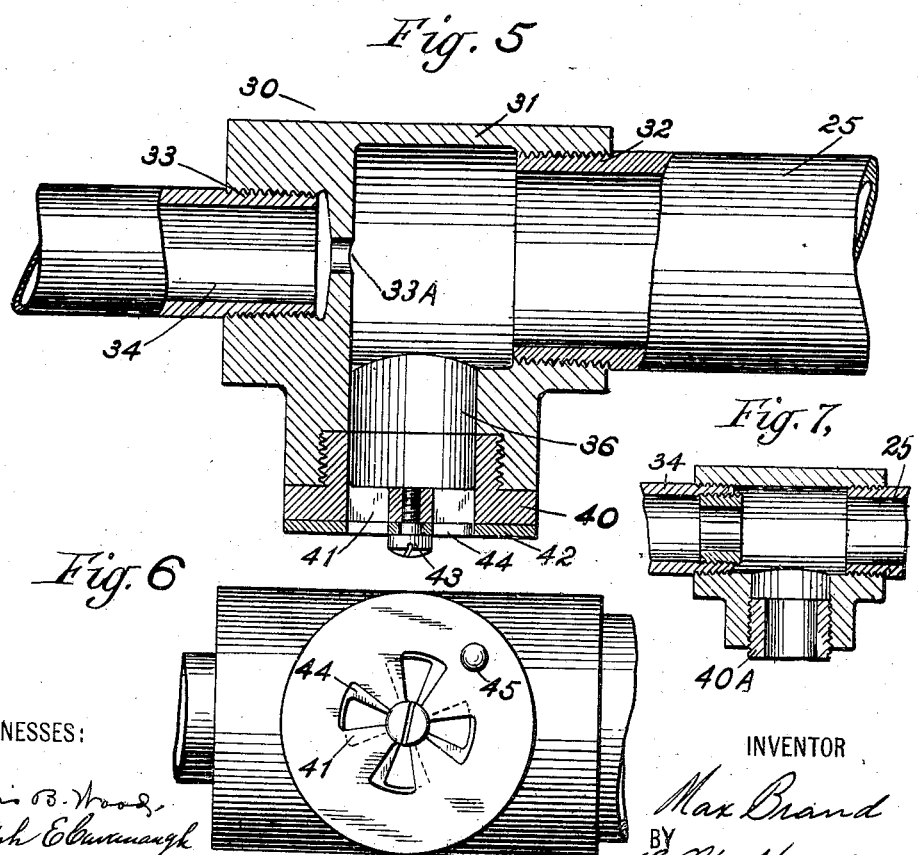
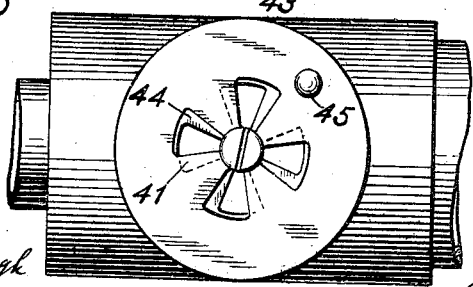
WITNESSES:
INVENTOR
Max Brand
BY
E. W. Marshall
ATTORNEY

UNITED STATES PATENT OFFICE.

MAX BRAND, OF NEW YORK, N. Y.

APPARATUS FOR BAKING.

No. 862,234.          Specification of Letters Patent.          Patented Aug. 6, 1907.

Application filed March 7, 1906. Serial No. 304,715.

*To all whom it may concern:*

Be it known that I, MAX BRAND, a citizen of the United States, and a resident of the city, county, and State of New York, have invented certain new and useful Improvements in Apparatus for Baking, of which the following is a specification.

My invention relates to apparatus for baking, and its object is to provide and improve upon methods and apparatus heretofore used and to provide a simple and efficient system for baking by the use of gas.

I will now describe my invention in the following specification and point out its novel features in claims.

Referring to the drawings, Figure 1 is a sectional plan view of an oven of ordinary construction. Fig. 2 is a sectional side elevation of this oven, the section being taken on the line A—B of Fig. 1. Fig. 3 is a side elevation, partially in section, of a portion of a simple burner which I use in carrying out my invention. Fig. 4 is a cross-sectional end view of the burner shown in Fig. 3.
Fig. 5 is a sectional side elevation of an improved mixing valve, and Fig. 6 is a plan view of the bottom of this mixing valve. Fig. 7 is a sectional side elevation of a simple form of my mixing valve.

Like characters of reference designate corresponding parts in all of the figures.

10 designates an oven of ordinary construction which may have its sides and top and bottom portions constructed of any desired material, which is preferably a non-conductor of heat. These sides and top and bottom portions may have a considerable thickness so that they will retain any heat which may be generated within the oven.

12 is a door in one end of the oven which may be provided to gain access to the interior of the oven.

13 is a bottom slab for the oven upon which articles to be baked may be placed.

20 designates a simple form of burner which I use in carrying out my invention. This is formed of an ordinary pipe of iron or other suitable material, which may have its sides perforated as shown at 21, 21 by a plurality of small holes. The pipe which forms this burner may be straight, or may be bent in any desired shape, or it may be made up in sections and coupled together in an ordinary manner by means of elbows 22 or other suitable fittings.

23 designates a standard T which may be used to couple together different sections of this pipe and into which may be screwed short sections 24 of pipe which act as standards or supports for the burner pipe 20.
The end one, 23$^A$, of these fittings is stopped at the end by plug 24$^A$.

30 designates a simple form of mixing valve which I use in carrying out my invention. This comprises a body portion 31 which is provided with three openings into one of which, 32, a pipe 25 is screwed. This pipe 25 is connected to the burner pipe 20 in any suitable manner. Another of these openings, 33, is arranged to receive a fuel supply or gas-pipe 34. The inner portion of this opening 33 is reduced, as shown at 33$^A$, to have a cross-sectional area considerably smaller than that of the gas-pipe 34. Into the third, 36, of these openings, a regulating valve 40 is screwed. This regulating valve is in the form of a circular plug with screw-threads upon its outer circumference arranged to be screwed into similar screw-threads in the bottom of the portion 31, and with its inner portion provided with slots or openings 41. Over these slots or openings a disk 42 is provided and arranged to be held in place by a screw 43 which is screwed into portion 40. This disk is provided with slots or openings 44 which are preferably of a similar shape and size to the openings 41. The disk is also provided, as shown at 45, with a handle by means of which the disk may be turned about the screw 43.

35 designates a stop-cock by means of which the gas-pipe 34 may be opened or closed.

The mixing valve 30 is shown constructed in a preferred manner. It may, however, for the sake of simplicity and cheapness of construction, be entirely built up of standard pipe fittings. In such a case the reduction opening 33$^A$ for the gas may be made by screwing a proper reducing plug into the gas-pipe 34; the portion 31 may be a standard T fitting, as shown in Fig. 7, and the air opening 36 may be made of the proper size by screwing into it another reduction bushing 40$^A$. The air opening may be regulated by changing the size of this reduction bushing. It is, however, found in practice that the proper size of bushing for this air opening may be easily determined and will need no further regulation after this is determined and once properly installed. The pipe 25, which connects the burner pipe to the mixing valve, may lead into the oven through openings in the wall 11 which are made for this purpose. The burner pipes 20 are placed directly within the oven 10 and are preferably placed along the sides of said oven in such a manner that they do not interfere with the material which is put into the oven to be baked. The gas-pipe 34 is connected to any suitable source of supply, and when the stop-cock 35 is open the gas is allowed to pass through the mixing valve 30 into the burner pipe 20 through the pipe 25. In passing through the mixing valve 30 the gas is carried into the burner pipes and draws into the burner pipes a supply of air which is regulated in amount by the position of the disk 42. This, of course, may be closed entirely, if desired, in which case the pure gas may be burned, but it is generally used with the disk 42 in such a position that a certain amount of air is allowed to pass into the burner pipes with the gas so as to provide a Bunsen flame.

The top of the oven 10 is provided with an outlet 14 for air and burned gases, and this outlet is provided with adjustable openings 15 forming an outlet-valve by means of which the size of the outlet may be regulated at will. There may be one or any desired number of burner pipes to put into an oven. I have shown in Fig. 1 two burner pipes as this is a convenient arrangement. These may be inserted in an oven which is already installed with great ease as the parts may be assembled outside of the oven and put into place with very little trouble. The oven may also be provided with an air inlet if desired.

In operation it is only necessary to turn on the gas and light that part of the burner pipe which is close to the door or opening 12 and the flame will carry itself along the entire length of the burner pipe. An oven may thus be readily heated and its temperature regulated at will by means of the stop-cock 35. The burner-pipes 20 are preferably provided with two sets of openings 21, 21, diametrically opposite each other. The flames issuing from the holes which are toward the wall of the oven are so arranged that the heat is transmitted directly to the walls. In other words, the burners are in direct operative relation to the heating surfaces of the oven which are heated readily thereby.

It may be seen that the oven 10 is a combustion chamber. Bread or other articles to be baked may be placed directly within this combustion chamber and may therefore be subjected to the heated gases from the burners and to the products of combustion. The quality and condition of these gases in the combustion chamber may be regulated by means of the outlet with its regulating means 15 so that the bread or other articles which are to be baked may be subjected to various conditions of gases which surround them.

My apparatus, of course, is capable of many modifications and may be used in many other ways than those herein shown and described, but the apparatus and the process which I have shown and described clearly illustrates the invention.

What I claim is:

1. In an apparatus for baking, the combination of walls of non-conducting material constructed to form a baking chamber within said walls, a Bunsen burner within said baking chamber, the burner so arranged that its flames impinge against the inner surface of the portion of the walls which form the sides of said chamber.

2. In an apparatus for baking, the combination of thick walls of non-conducting material constructed to form a baking chamber within said walls, a plurality of gas burners within said baking chamber, said burners being placed in proximity to the side walls of the chamber and so arranged that a portion of their flames impinge directly against the inner surface of said side walls.

3. In an apparatus for baking, the combination of thick walls of non-conducting material constructed to form a closed baking chamber and an outlet, a door to said chamber, a pipe within the chamber and extending along the side or sides of the chamber, said pipe being provided with holes through which a burning mixture of illuminating gas and air may issue against said side or sides of the chamber whereby the temperature of the chamber may be raised.

4. In an apparatus for baking, the combination of thick walls of non-conducting material constructed to form a closed baking chamber, a door, an outlet valve, a pipe connected with a source of gas supply, a mixing valve in said pipe and a burner pipe within the baking chamber and extending along the side or sides of the chamber, said pipe being provided with holes through which a burning mixture of illuminating gas and air may issue against said side or sides of the chamber, whereby both the sides and the roof of the chamber may be raised to a baking temperature.

5. In an apparatus for baking, the combination of thick walls of non-conducting material constructed to form a closed baking chamber and an outlet, a door to said chamber and an adjustable valve in the outlet, a pipe connected with a source of gas supply, a mixing valve in said pipe built up, as shown and described, of pipe fittings, and a burner pipe within said chamber and extending along the side or sides of the chamber, said pipe being provided on opposite sides with holes through which a burning mixture of illuminating gas and air may issue and so arranged that a part of said burning mixture impinges directly against said side or sides of the chamber, whereby both the sides and the roof of the chamber may be raised to a baking temperature.

In testimony whereof I have signed my name to this specification in the presence of two subscribing witnesses.

MAX BRAND.

Witnesses:
ERNEST W. MARSHALL,
GEORGE M. BROOKS.